Patented Apr. 24, 1934

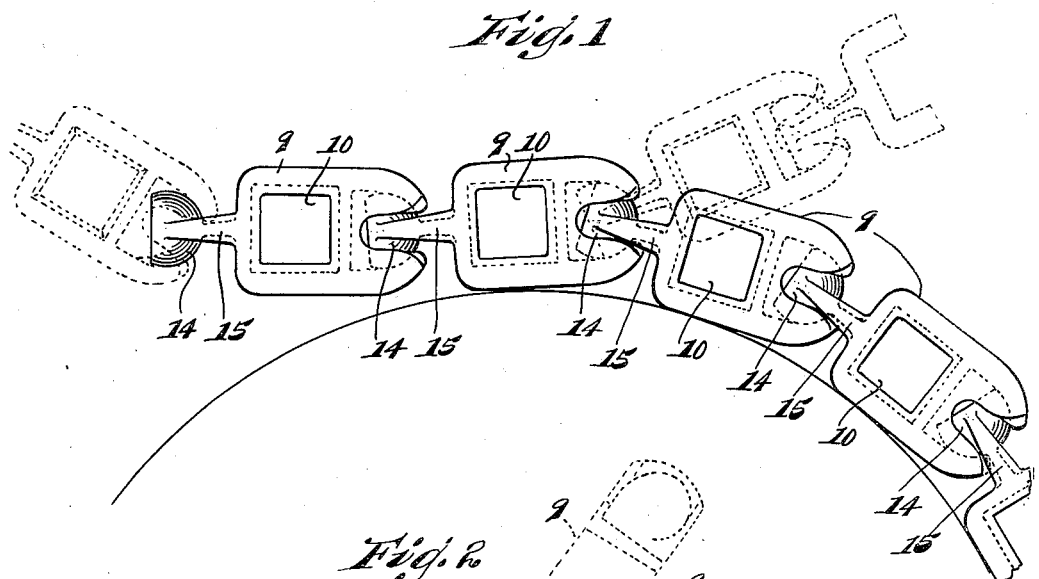
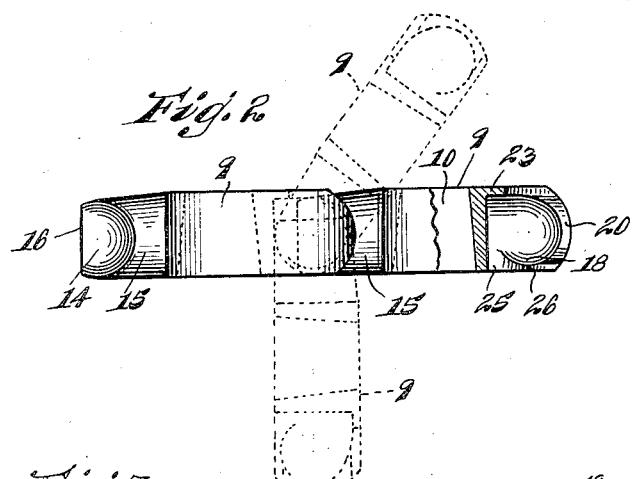
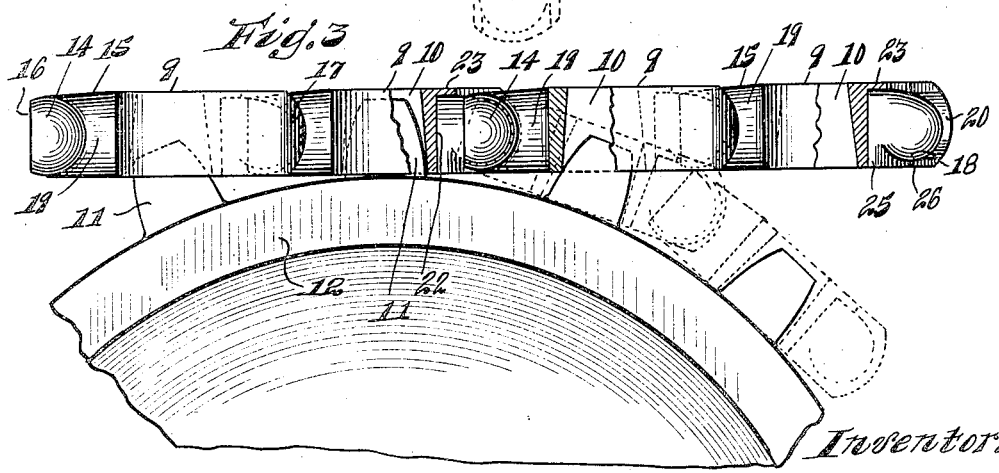

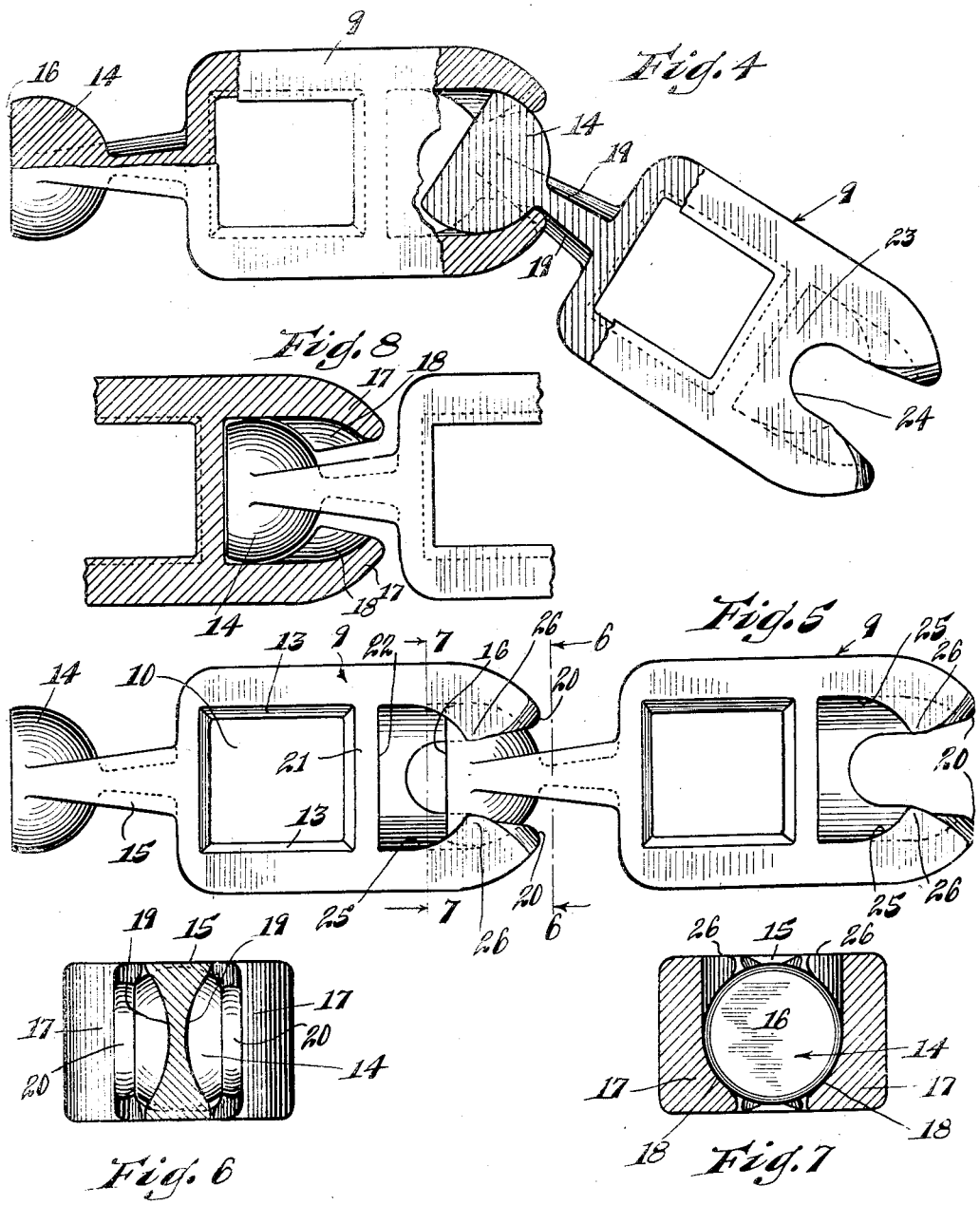

1,956,298

UNITED STATES PATENT OFFICE 1,956,298

CHAIN

Walter H. Paulson, Chicago, Ill., assignor to Harry D. Lathrop, Chicago, Ill.

Application August 16, 1930, Serial No. 475,815

5 Claims. (Cl. 74—32)

This invention relates to improvements in a chain, and an object is the provision of a chain construction strong, durable and efficient in use, in which the individual links are capable of relative displacement or flexing in a plurality of planes and directions without subjecting the construction to excessive strains or stresses. A further object is the provision of a chain construction in which the respective links are joined by a novel structural arrangement, allowing great relative angular displacement of adjacent links without excessive stress or strain upon the parts. An additional object is the provision of an improved chain construction having a ball and socket connection between the respective links, with special provision for increasing the bearing surfaces to compensate for the number or variety of angular positions in which the adjacent links may be placed.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a plan view of a portion of the improved chain, showing a plurality of connected links with successive links relatively flexed or displaced;

Fig. 2 is a side elevational view of two connected links of the chain, illustrating in dotted lines the degrees and extent of relative displacement in a vertical plane or plane perpendicular to the plane of displacement shown in Fig. 1;

Fig. 3 is a side elevational view, partly in section, of a portion of the chain in operative engagement with a sprocket wheel;

Fig. 4 is a plan view of two connected links, partly in section, showing the improved construction for affording a greater bearing surface between the ball and socket on the respective links;

Fig. 5 is an inverted face view of two adjoining links in operative engagement;

Fig. 6 is a transverse section, taken substantially on the line 6—6 of Fig. 5;

Fig. 7 is a sectional view, taken substantially on the line 7—7 of Fig. 5; and

Fig. 8 is a view of the connected portions of two adjacent links, partly in section, showing the manner of disengagement.

As illustrated in the drawings, the preferred embodiment of the invention comprises a plurality of connected links, each of which is composed of a rigid block 9. Each block 9 is preferably formed to provide a rectangular tooth engaging and receiving aperture 10 for the reception and engagement by a tooth 11 of a sprocket 12. As shown, the side walls 13 surrounding the aperture 10 preferably taper outwardly or in a diverging direction downwardly from the top of each link. Each link is provided with an offset head 14 joined with the main block portion 9 by a relatively narrow shank 15. As shown, the head 14 is generally spherical in formation, with a transverse flat extremity 16 a substantial distance beyond a plane through the diametrical center of the head, looking in a direction from the block 9. This formation aids in providing a relatively large bearing surface, as presently described, and also provides for the rapid and convenient disengagement of connecting links.

The head 14 is adapted to coact with a socket construction on an adjoining link to complete a ball and socket engagement. Therefore, upon the end of each block opposite to that upon which head 14 is provided, there are formed two inwardly curved arms 17 with the extremities spaced apart to allow room for the shank 15 of a connected link, and having their inner surfaces 18 of spherical formation to receive the spherical surface portion of a head 14. The spacing between the inwardly curved arm 17 is preferably sufficient to allow for universal displacement of connected links to a considerable degree, as shown in the various views. To provide for a relatively greater bearing surface without sacrifice of strength or durability, each side of shank 15 has a concave surface 19, and correspondingly each arm 17 has a curved extremity 20 formed on substantially the same radius as concave portion 19.

The side portions of each block 9 are joined by a transverse wall 21 having a flat surface 22 contiguous to surface 16 of an engaged head, and on the upper surface of each link there is provided for strengthening purposes a web portion 23 disposed above the socket portion and provided with a shank receiving slot 24. The opposite face of each link is formed to provide an opening 25 which, with the surface 22, furnishes an opening of slightly greater sectional area than that of a ball head 16. This construction and formation allows for the provision of an inwardly extending projection 26 upon each arm 17 to increase the bearing surface, and the opening 25 provides for the disengagement of an adjacent link by shifting the two links toward each other until the transverse head end 16 contacts with surface 22. Thereupon head 14 is passed through opening 25 for disengagement of two connecting links.

Thus it will be seen that not only is universal relative displacement of adjoining links provided for, but considerable torsional or twisting displacement. As shown in Fig. 4, the spherical surface of head 14 is continued toward the extremity of the head to provide a bearing surface contacting with a surface 18 throughout maximum relative displacement of a pair of connected links.

In general operation, the weight and tension of the chain maintain the links in operative engagement, but inasmuch as pivot pins and similar pivoting devices are entirely dispensed with, a chain may be shortened or lengthened by the simple expedient of shifting adjacent links together in the manner described to effect disengagement, and thus add or remove as many links as desired. Not only are pivot pins and hinge mechanisms dispensed with, but each link is a rigid unit, contributing to the reduction of cost of manufacture, as the links are identical in structure and formation.

The improved construction may be employed for a wide variety of purposes, such as a conveyor chain, power drive chain, et cetera, and where relative displacement of the links in a horizontal plane is desired, as shown in Fig. 1, suitable channels or grooves may be provided for the reception of the chain, and the construction renders the device adaptable to a number of installations where a chain having pivotally connected links of the usual type would be objectionable or entirely unsuitable. By the construction disclosed, the wear is not confined to a small area or upon a relatively small part, but is distributed over the entire spherical surface of the head and socket portions. This area of these surfaces have been increased in the present invention consistent with the intended use and adaptability of the structure.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A conveyor chain comprising a plurality of connected links, each link having a main block portion, a head, a shank joining said head to the block portion, a socket adapted to receive the head of an adjacent link and having an open rear wall adjacent the socket adapted to receive the shank of the adjacent link, said block having adjacent the rear wall opening and centrally disposed with respect thereto relatively narrow rearwardly and inwardly inclined extensions, and the shank of each link having central longitudinal recesses adapted to receive the said extensions of the adjacent link.

2. A conveyor chain comprising a plurality of links, each link having a body portion, a shank formed integral with said body and a head carried by said shank, the body portion of the link being provided with a socket adapted to receive the head of an adjacent link and with an opening in the rear wall receiving the shank of the adjacent link, said body having also near the rear wall opening relatively narrow rib extensions extending inwardly and rearwardly from the wall, and the shank of each link being provided with central longitudinal recesses adapted to receive the said ribs of an adjacent link.

3. A conveyor chain comprising a plurality of links, each link having a body, a shank and a head carried by said shank, said body being provided at its rear with a socket adapted to receive the head of an adjacent link and with an outwardly flared opening in the rear wall adapted to receive the shank of an adjacent link, said body being also provided with integral ribs extending inwardly and rearwardly from the rear wall of the body and at a substantially central point thereof, and the shank of each link being provided with longitudinal central recesses adapted to receive the ribs of an adjacent link.

4. A conveyor chain comprising a plurality of links, each link having a body, a shank and a head carried by said shank, said body being provided at its rear with a socket adapted to receive the head of an adjacent link and with an outwardly flared opening in the rear wall adapted to receive the shank of an adjacent link, said body being also provided with inwardly extending ribs at a substantially central point of the rear wall of the body, and a shank of each link having relatively wide top and bottom flanges and longitudinal central recesses between the flanges adapted to receive the ribs of an adjacent link.

5. A conveyor chain comprising a plurality of links, each link having a body, a shank and a head carried by said shank, said body being provided at its rear with a socket adapted to receive a head of an adjacent link, and with an opening in the rear wall adapted to receive the shank of said adjacent link, said body having also inwardly extending and centrally disposed bosses adjacent said rear opening, and a shank of each link being provided with central recesses adapted to receive the bosses of an adjacent link.

WALTER H. PAULSON.